United States Patent [19]
Aoki

[11] Patent Number: 6,098,737
[45] Date of Patent: Aug. 8, 2000

[54] COUPLING DEVICE WHICH IS DISPOSED BETWEEN LEFT AND RIGHT WHEELS OF VEHICLE

[75] Inventor: Jun Aoki, Saitama-ken, Japan

[73] Assignee: Honda Giken Kogyo Kabushiki Kaisha, Tokyo, Japan

[21] Appl. No.: 09/049,106

[22] Filed: Mar. 27, 1998

[30] Foreign Application Priority Data

Apr. 21, 1997 [JP] Japan ..................................... 9-103177

[51] Int. Cl.[7] .............................................. B60K 17/356
[52] U.S. Cl. ........................ 180/242; 180/248; 180/6.44; 475/28; 475/221
[58] Field of Search .................................. 475/298, 221, 475/18, 28; 180/65.2, 248, 242, 6.44, 6.28

[56] References Cited

U.S. PATENT DOCUMENTS

| | | | |
|---|---|---|---|
| 1,984,830 | 12/1934 | Higley | 475/21 |
| 3,799,284 | 3/1974 | Hender | 180/65.2 |
| 4,998,591 | 3/1991 | Zaunberger | 180/6.44 |
| 5,540,299 | 7/1996 | Tohda et al. | 180/243 |
| 5,643,129 | 7/1997 | Richardson | 475/204 |
| 5,704,867 | 1/1998 | Bowen | 475/221 |
| 5,916,054 | 6/1999 | Kobayashi | 475/220 |

*Primary Examiner*—Lanna Mai
*Attorney, Agent, or Firm*—Armstrong, Westerman, Hattori, McLeland & Naughton

[57] ABSTRACT

In a coupling device which is disposed between left and right wheels of a vehicle, pair of differential gears are provided. First rotational elements of both the differential gears are coupled to each other, and second rotational elements are respectively coupled to left and right wheels of the vehicle. A third rotational element of one of the differential gears is driven for rotation by a driving source. The third rotational element of the other of the differential gears is made switchable by a switching device between a state in which the third rotational element is prevented from rotating and a state in which the third rotational element is coupled to the first rotational element or the second rotational element of the other of the differential gears. Otherwise, the third rotational element of the other of the differential gears may be arranged to be always prevented from rotating. In this arrangement, the first and second rotational elements of the other of the differential gears are selectively coupled via the switching device to the wheels, or the first rotational element of one of the differential gears is selectively coupled via the switching device to the first and second rotational elements of the other of the differential gears.

3 Claims, 5 Drawing Sheets

COUPLING DEVICE WHICH IS DISPOSED BETWEEN LEFT AND RIGHT WHEELS OF VEHICLE

BACKGROUND OF THE INVENTION

1. Field of the Invention

The present invention relates to a coupling device which is disposed between left and right wheels of a vehicle, in particular between the left and right idler wheels that are not driven by an engine.

2. Description of the Related Art

Conventionally, as this kind of coupling device, there is known, in Published Unexamined Patent Application Ser. No. 131855/1993, a coupling device in which: between the left and right wheels there are provided a first coupling passage which transmits the rotation of one of the left and right wheels to the other thereof with increasing speed, and a second coupling passage which transmits the rotation of one of the wheels to the other thereof with decreasing speed; in both the coupling passages a clutch is interposed respectively; and at the time of cornering when one of the wheels becomes an inner wheel, the clutch for the first coupling passage is engaged, and at the time of cornering when one of the wheels becomes an outer wheel, the clutch for the second coupling passage is engaged so that the outer wheel is positively speeded up as compared with the inner wheel. In this manner, by generating a braking force on the inner wheel side and a driving force on the outer wheel side, the cornering performance is improved.

At the time of starting on a slippery road such as on a snowy road or the like, it is proposed to perform starting assistance by driving the idler wheels by a driving source such as an electric motor or the like. It is desired to obtain a starting assistance function in addition to the above-described cornering assistance function in that the cornering performance is improved by generating a difference rotation between the left and right wheels.

The present invention has an object of providing a compact and inexpensive coupling device which meets the above-described desire and in which a difference rotation between the left and right wheels can be generated by utilizing the driving source for the starting assistance.

SUMMARY OF THE INVENTION

In order to solve the above-described problem, according to a first aspect of the present invention, there is provided a coupling device which is disposed between left and right wheels of a vehicle, comprising: a pair of differential gears, each comprising first, second, and third rotational elements which are rotatable relative to one another, wherein the first rotational elements of both the differential gears are coupled to each other, and wherein the second rotational elements of both the differential gears are coupled to the left and right wheels respectively; a driving source which drives to rotate the third rotational element of one of the differential gears; and switching means which is switchable between a state in which the third rotational element of the other of the differential gears is prevented from rotating, and a state in which the third rotational element of the other of the differential gears is coupled to one of the first rotational element and the second rotational element of said the other of the differential gears such that the first through the third rotational elements of said the other of the differential gears are rotatable together.

According to a second aspect of the present invention, there is provided a coupling device which is disposed between left and right wheels of a vehicle, comprising: a pair of differential gears, each comprising first, second, and third rotational elements in which difference rotation can be generated, wherein the first rotational elements of both the differential gears are coupled to each other, and wherein the second rotational element of one of the differential gears is coupled to one of the left and right wheels; a driving source which drives to rotate the third rotational element of said one of the differential gears; wherein the third rotational element of the other of the differential gears is prevented from rotating; switching means which selectively couples the first rotational element and the second rotational element of said the other of the differential gears to the other of the left and right wheels.

According to a third aspect of the present invention, there is provided a coupling device which is disposed between left and right wheels of a vehicle, comprising: a pair of differential gears, each comprising first, second, and third rotational elements in which difference rotation can be generated; switching means which selectively couples the first rotational element of one of the differential gears to the first rotational element and the second rotational element of the other of the differential gears; wherein the second rotational elements of both the differential gears are coupled to the left and right wheels respectively; a driving source which drives to rotate the third rotational element of said one of said differential gears; wherein the third rotational element of said the other of the differential gears is prevented from rotating.

In any one of the above-described aspects of the present invention, switching can be made between a state in which, by the switching means, starting assistance is performed by evenly distributing the power from the driving source to the left and right wheels, and a state in which cornering assistance is performed by generating difference rotation between the left and right wheels by the power from the driving source.

As described hereinabove, according to the present invention, by combining the differential gears and the driving source, there can be obtained a compact and inexpensive coupling device which has a starting assistance function and a cornering assistance function.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
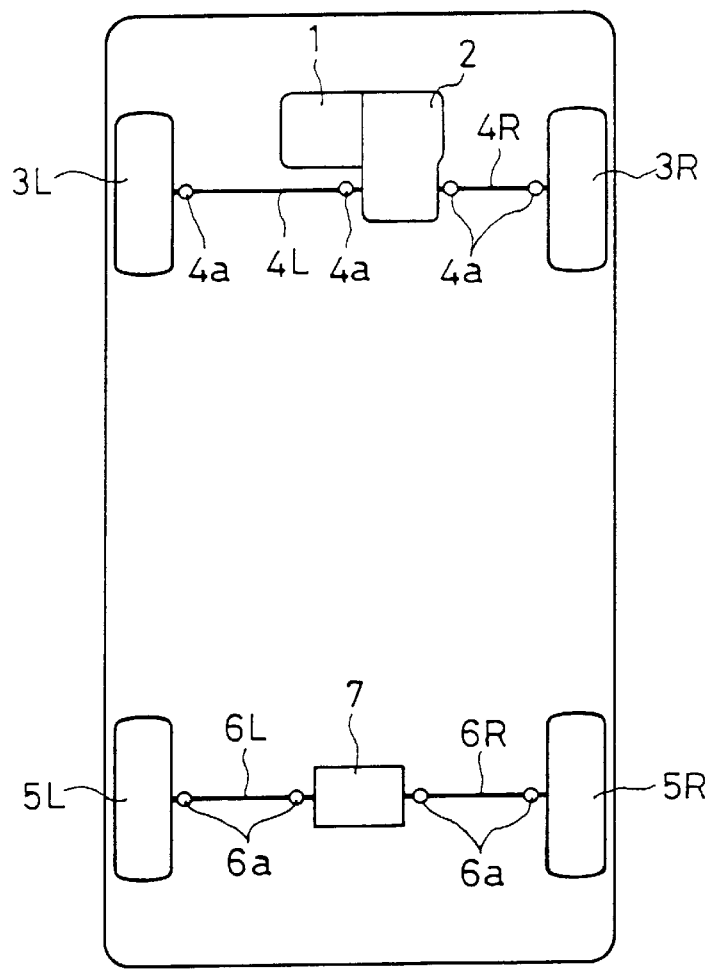
FIG. 1 is a schematic diagram showing an example of using the coupling device of the present invention.

FIG. 1 shows a front-wheel-drive vehicle in which the left and right front wheels 3L, 3R are driven by an engine 1 via a transmission 2. Each of the front wheels 3L, 3R is coupled to the transmission 2 via each drive shaft 4L, 4R which has respectively constant velocity joints 4a on both ends.

To the left and right rear wheels 5L, 5R, which are idler wheels, there are connected coupling shafts 6L, 6R which have respectively constant velocity joints 6a on both ends, and a coupling device 7 is interposed between both the coupling shafts 6L, 6R.

Figure 2:
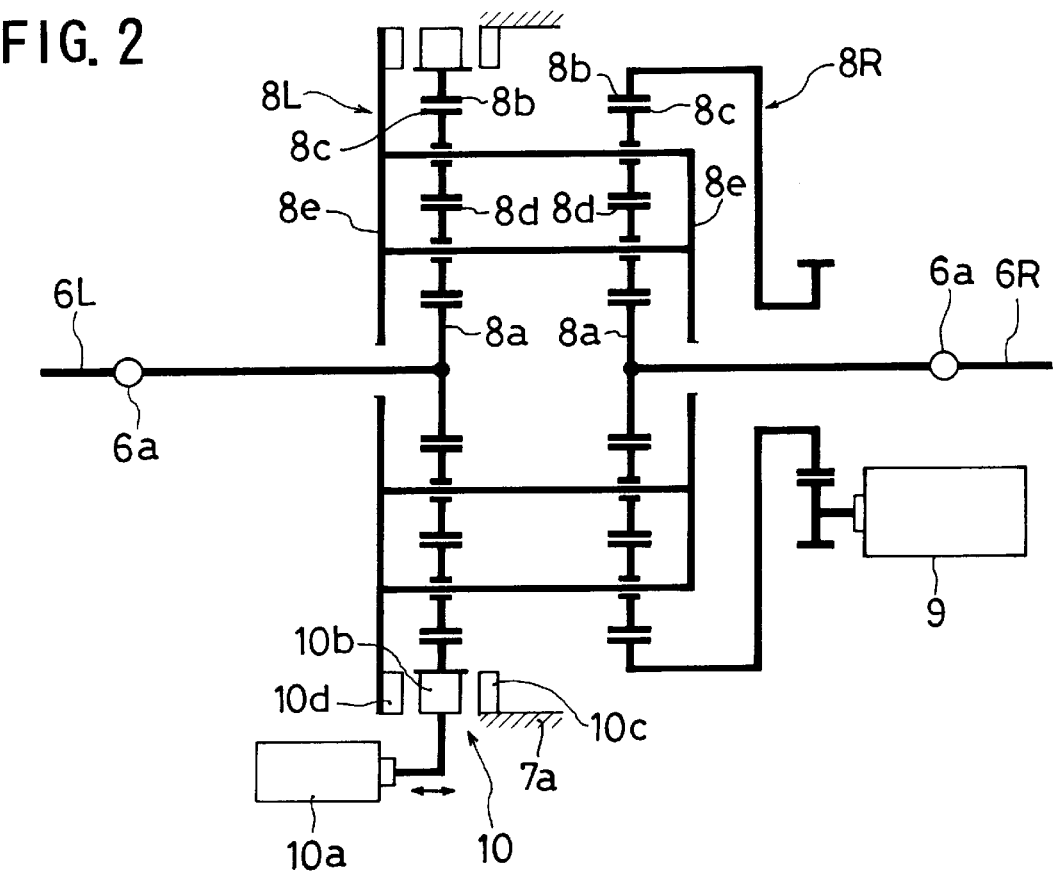
FIG. 2 is a skeleton diagram showing a first embodiment of the coupling device of the present invention.

The coupling device 7 is provided, as shown in FIG. 2, with a pair of left and right differential gears 8L, 8R, a driving source 9 which is constituted by an electric motor, and a switching means 10. Each of the differential gears 8L, 8R is constituted into a planetary type of differential gear which comprises a sun gear 8a, a ring gear 8b, and a carrier 8e for supporting a first pinion 8c which engages with the ring gear 8b and a second pinion 8d which engages with both the sun gear 8a and the first pinion 8c.

In the embodiment illustrated in FIG. 2, the carriers 8e, 8e, which are defined as first rotational elements, are coupled to each other. Further, the sun gear 8a, which is defined as a second rotational element, of the differential gear 8L on the left side (hereinafter called "the left side differential gear 8L") is coupled to the coupling shaft 6L of the left rear wheel, and the sun gear 8a, which is defined as the second rotational element, of the right rear wheel is coupled to the coupling shaft 6R of the right rear wheel.

The driving source 9 is disposed to drive to rotate the ring gear 8b, which is defined as a third rotational element, of the differential gear 8R on the right side (hereinafter called "the right side differential gear 8R"). The switching means 10 is constituted by a dog clutch having a movable dog 10b which is coupled to an actuator 10a such as a solenoid or the like. The movable dog 10b is arranged to be slidably engaged with the ring gear 8b, which is defined as a third rotational element of the left side differential gear 8L, so as to be nonrotatable relative to the ring gear 8b. The movable dog 10b is further arranged to be selectively engaged with a dog 10c which is mounted on a casing 7a of the coupling device 7 and a dog 10d which is mounted on the carrier 8e of the left side differential gear 8L. The switching means 10 is thus switchable between a state in which the ring gear 8b of the left side differential gear 8L is prevented from rotating and a state in which the ring gear 8b is coupled to the carrier 8e of the left side differential gear 8L. Instead of the above, the following arrangement may also be employed. Namely, the ring gear 8b of the left side differential gear 8L is coupled to the sun gear 8a of the left side differential gear 8L via the switching means 10.

Now, if the ring gear 8b of the left side differential gear 8L is coupled to the carrier 8e by the switching means 10, the sun gear 8a of the left side differential gear 8L rotates together or integrally with the carrier 8e. If the ring gear 8b of the right side differential gear 8R is rotated in the normal direction of rotation (hereinafter simply called "normal direction") by the driving source 9 in this state, the sun gear 8a of the right side differential gear 8R is rotated in the normal direction via the first pinion 8c and the second pinion 8d. The carrier 8e is also rotated in the normal direction. As a result of these rotations in the normal direction, the sun gear 8a of the left side differential gear 8L also rotates in the normal direction. Further, if the ring gear 8b of the right side differential gear 8R is rotated in the reverse direction of rotation (hereinafter simply called "reverse direction"), the sun gears 8a, 8a of the left and right differential gears 8L, 8R are both rotated in the reverse direction. In this manner, at the time of starting the vehicle, if the ring gear 8b of the right side differential gear 8R is rotated in the normal direction or in the reverse direction by the driving source 9 in a state in which the ring gear 8b of the left side differential gear 8L is coupled to the carrier 8e, both the left and right rear wheels 5L, 5R are rotated either in the normal direction or in the reverse direction, whereby starting assistance in the forward running or in the reverse running is performed.

If the ring gear 8b of the right side differential gear 8R is rotated in the normal direction in a state in which the ring gear 8b of the left side differential gear 8L is prevented from rotating by the switching means 10, the carrier 8e rotates in the normal direction relative to the sun gear 8a of the right side differential gear 8R. Then, accompanied by the rotation in the normal direction of the carrier 8e, the first pinion 8c of the left side differential gear 8L rotates in the reverse direction on its own axis while revolving in the normal direction by the engagement of the first pinion 8c with the ring gear 8b which is in the state of being prevented from rotating. The sun gear 8a of the left side differential gear 8L is thus rotated in the reverse direction via the second pinion 8d relative to the carrier 8e. Therefore, the sun gear 8a of the right side differential gear 8R rotates at a higher speed than the speed of the sun gear 8a of the left side differential gear 8L. As a result, the right rear wheel 5R is rotated with increasing speed (or is speeded up) as compared with the left rear wheel 5L. If the ring gear 8b of the right side differential gear 8R is rotated by the driving source 9 in the reverse direction, the sun gear 8a of the left side differential gear 8L is rotated at a higher speed than the speed of the sun gear 8a of the right side differential gear 8R. As a result, the left rear wheel 5L is rotated with increasing speed as compared with the right rear wheel 5R. In this manner, at the time of cornering, the rear wheel on the outer side is rotated with increasing speed as compared with the rear wheel on the inner side, whereby cornering assistance can be performed.

Figure 3:
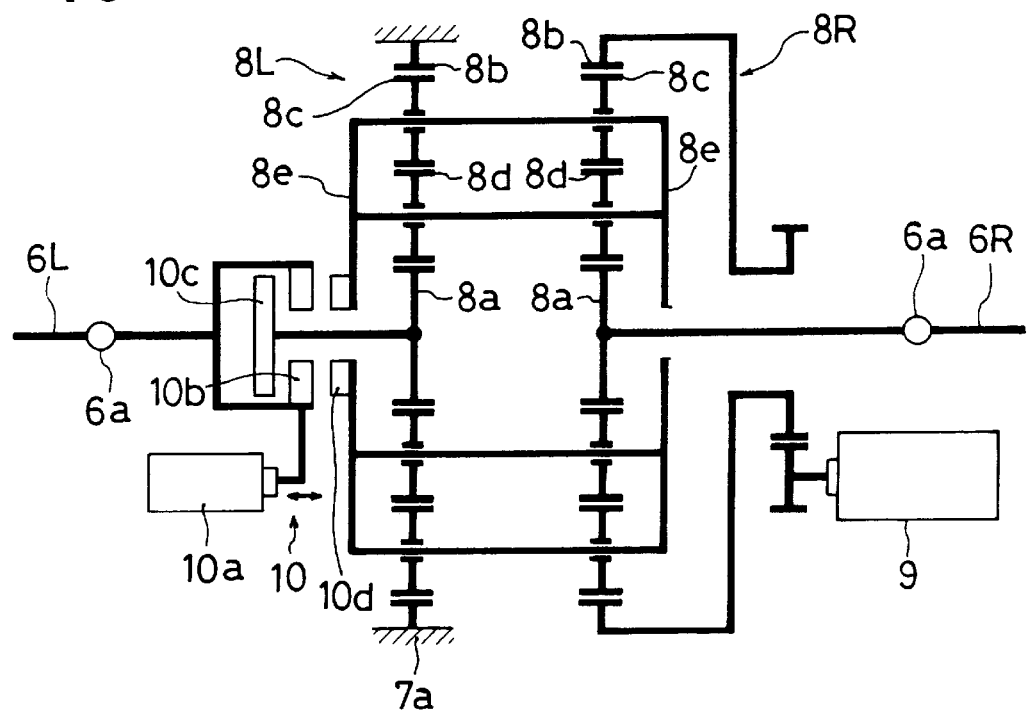
FIG. 3 is a skeleton diagram showing a second embodiment of the coupling device of the present invention.

FIG. 3 shows a second embodiment of the coupling device 7. The differences of this embodiment from the first embodiment follow. Namely, the ring gear 8b of the left side differential gear 8L is coupled to the casing 7a to thereby prevent the ring gear 8b from rotating. Further, the sun gear 8a and the carrier 8e of the left side differential gear 8L are selectively coupled to the coupling shaft 6L for the left rear wheel via the switching means 10. In other words, the movable dog 10b of the switching means 10 is slidably engaged with the coupling shaft 6L so as to be nonrotatable relative to the coupling shaft 6L. The movable dog 10b is thus arranged to be selectively engaged with the dog 10c which is mounted on the sun gear 8a of the left side differential gear 8L and the dog 10d which is mounted on the carrier 8e.

In this second embodiment, if the sun gear 8a of the left side differential gear 8L is coupled to the coupling shaft 6L by the switching means 10, the same state is attained as in the state in which, in the first embodiment, the ring gear 8b of the left side differential gear 8L is prevented from rotating. Therefore, if the ring gear 8b of the right side differential gear 8R is rotated by the driving source 9 in the normal direction or in the reverse direction, the right rear wheel 5R is rotated with increasing speed or with decreasing speed as compared with the left rear wheel 5L, whereby cornering assistance can be performed.

If the carrier 8e is coupled to the coupling shaft 6L by the switching means 10 and, in this state, if the ring gear 8b of the right side differential gear 8R is rotated in the normal direction or in the reverse direction by the driving source 9, the coupling shaft 6R for the right rear wheel is rotated in the normal direction or in the reverse direction via the sun gear 8a of the right side differential gear 8R. Also, the coupling shaft 6L for the left rear wheel is rotated in the normal direction or in the reverse direction via the carrier 8e. Starting assistance in the forward running or in the reverse running is thus performed.

Figure 4:
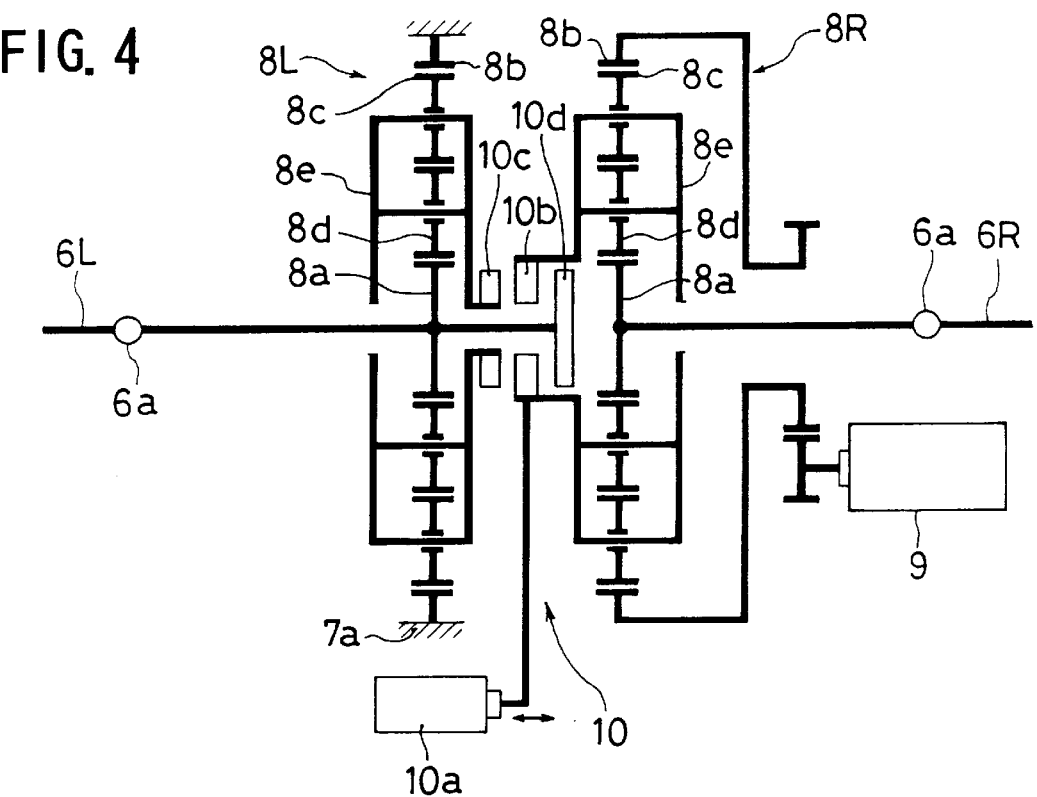
FIG. 4 is a skeleton diagram showing a third embodiment of the coupling device of the present invention.

FIG. 4 shows a third embodiment of the coupling device 7. The differences of this embodiment from the first embodiment are as follows. Namely, the ring gear 8b of the left side differential gear 8L is coupled to the casing 7a to thereby prevent the ring gear 8b from rotating. Further, the carrier 8e of the right side differential gear 8R is arranged to be selectively coupled to the carrier 8e and the sun gear 8a of the left side differential gear 8L via the switching means 10. In other words, the movable dog 10b of the switching means 10 is slidably engaged with the carrier 8e of the right side differential gear 8R so as to be nonrotatable relative to the carrier 8e, and the movable dog 10b is selectively engaged with the dogs 10c, 10d which are respectively mounted on the carrier 8e and the sun gear 8a of the left side differential gear 8L.

Also in the third embodiment, starting assistance is performed by coupling the carrier 8e of the right side differential gear 8R to the sun gear 8a of the left side differential gear 8L by the switching means 10, and cornering assistance is performed by coupling the carrier 8e of the right side differential gear 8R to the carrier 8e of the left side differential gear 8L.

Figure 5:
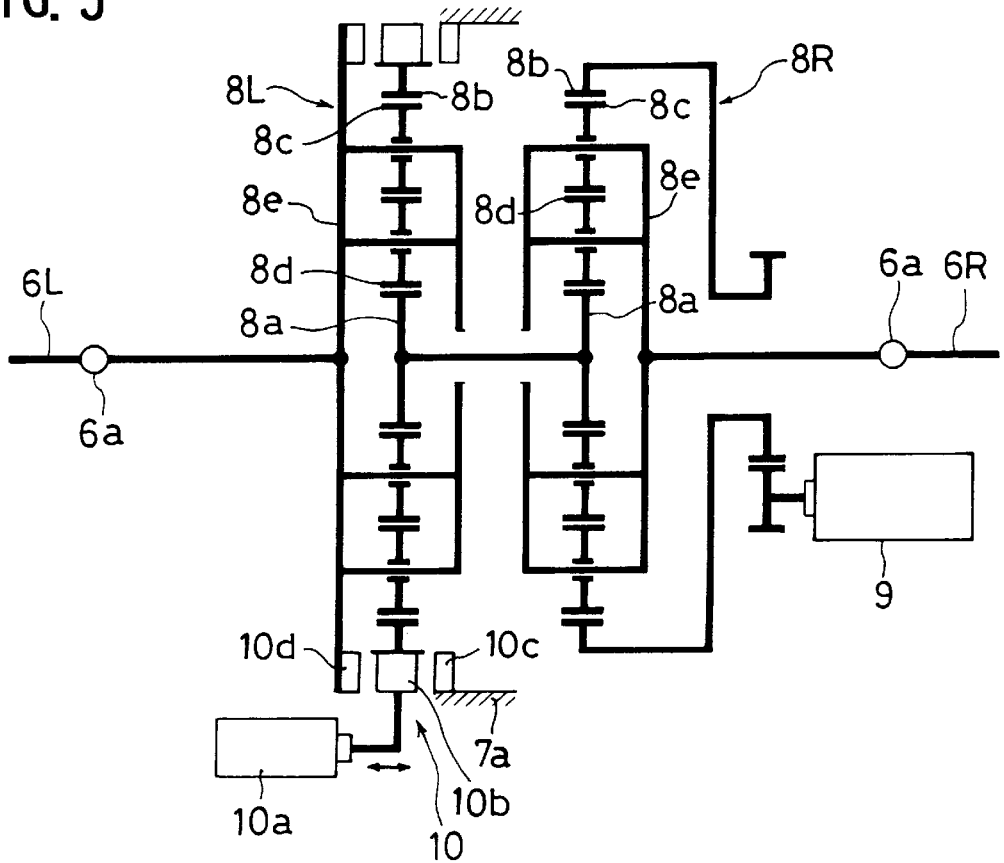
FIG. 5 is a skeleton diagram showing a fourth embodiment of the coupling device of the present invention.

FIG. 5 shows a fourth embodiment of the coupling device 7. The differences of this embodiment from the first embodiment follow. Namely, the sun gear 8a is defined to be the first rotational element, and the sun gears 8a, 8a of the left and the right differential gears 8L, 8R are coupled to each other. The carrier 8e is defined to be the second rotational element, and the carriers 8e, 8e of the left and right differential gears 8L, 8R are respectively coupled to the left and right coupling shafts 6L, 6R.

In the fourth embodiment, if the ring gear 8b, which is defined to be the third rotational element, of the left side differential gear 8L is coupled to the carrier 8e of the left side differential gear 8L, the carrier 8e, i.e., the left rear wheel 5L comes to be rotated together with the sun gear 8a. In this manner, if the ring gear 8b of the right side differential gear 8R is rotated by the driving means 9 in the normal direction or in the reverse direction, the carrier 8e of the right side differential gear 8R is rotated in the normal direction or in the reverse direction. Also the carrier 8e of the left side differential gear 8L is rotated in the normal direction or in the reverse direction via the sun gear 8a. Starting assistance in the forward running or in the reverse running can thus be performed.

If the ring gear 8b of the left side differential gear 8L is prevented from rotating by the switching means 10, the carrier 8e of the left side differential gear 8L is rotated in the revere direction relative to the sun gear 8a with the ring gear 8b serving as a reaction force receiving member. Therefore, if the ring gear 8b of the right side differential gear 8R is rotated in the normal direction or in the reverse direction by the driving means 9, the right rear wheel 5R is rotated with increasing speed or with decreasing speed as compared with the left rear wheel 5L. Cornering assistance can thus be performed.

Figure 6:
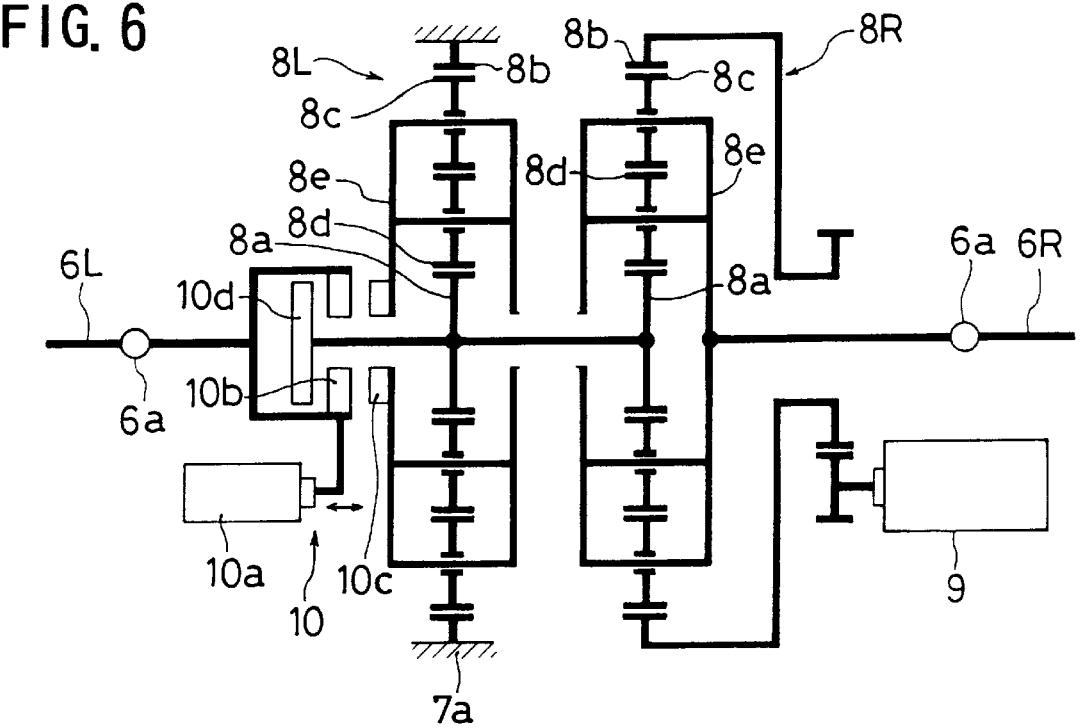
FIG. 6 is a skeleton diagram showing a fifth embodiment of the coupling device of the present invention.

FIG. 6 shows a fifth embodiment of the coupling device 7. The differences of this embodiment from the fourth embodiment are as follows. Namely, the ring gear 8b of the left side differential gear 8L is coupled to the casing 7a to thereby prevent the ring gear 8b from rotating. Further, the carrier 8e and the sun gear 8a of the left side differential gear 8L are selectively coupled to the coupling shaft 6L for the left rear wheel via the switching means 10. In other words, the movable dog 10b of the switching means 10 is slidably engaged with the coupling shaft 6L so as to be nonrotatable relative to the coupling shaft 6L, and the movable dog 10b is selectively engaged with the dogs 10c, 10d which are respectively mounted on the carrier 8e and the sun gear 8a of the left side differential gear 8L.

In the fifth embodiment, starting assistance is performed by coupling the sun gear 8a of the left side differential gear 8L to the coupling shaft 6L. Cornering assistance can be performed by coupling the carrier 8e of the left side differential gear 8e to the coupling shaft 6L.

Figure 7:
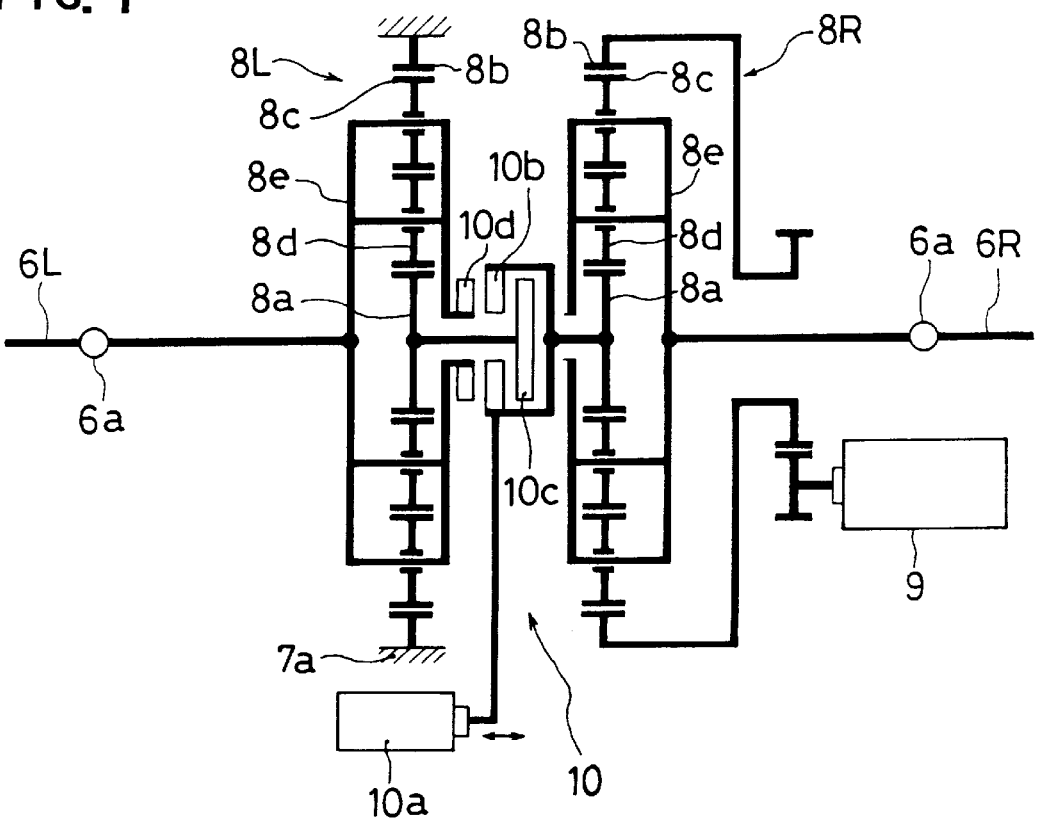
FIG. 7 is a skeleton diagram showing a sixth embodiment of the coupling device of the present invention.

FIG. 7 shows a sixth embodiment of the coupling device 7. The differences of this embodiment from the fourth embodiment are as follows. Namely, the ring gear 8b of the left side differential gear 8L is coupled to the casing 7a to thereby prevent the ring gear 8b from rotating. And the sun gear 8a of the right side differential gear 8R is selectively coupled to the sun gear 8a and the carrier 8e of the left side differential gear 8L via the switching means 10. In other words, the movable dog 10b of the switching means 10 is slidably engaged with the sun gear 9a of the right side differential gear 8R so as to be nonrotatable relative to the sun gear 8a, and the movable dog 10b is selectively engaged with the dogs 10c, 10d which are respectively mounted on the sun gear 8a and the carrier 8e of the left side differential gear 8L.

In the sixth embodiment, starting assistance is performed by coupling the sun gear 8a of the right side differential gear 8R to the carrier 8e of the left side differential gear 8L by the switching means 10. Cornering assistance is performed by coupling the sun gear 8a of the right side differential gear 8R to the sun gear 8a of the left side differential gear 8L.

Figure 8:
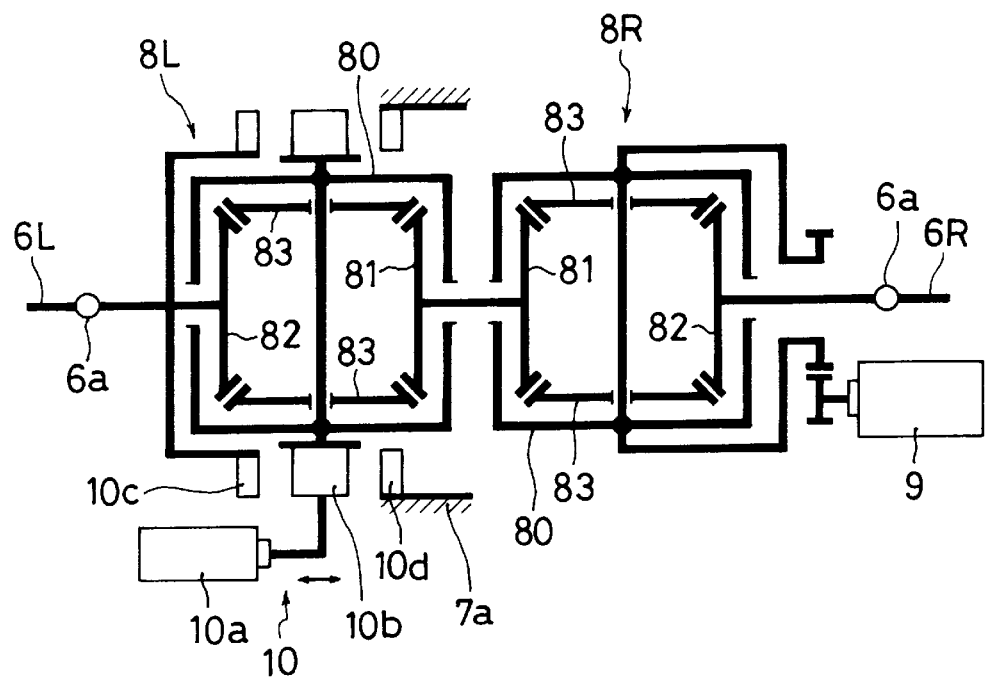
FIG. 8 is a skeleton diagram showing a seventh embodiment of the coupling device of the present invention.

FIG. 8 shows a seventh embodiment of the coupling device 7. In this embodiment, each of the left and right differential gears 8L, 8R is constituted by a bevel gear type of differential gear which is made up by rotatably supporting, on a differential gear case 80, a pair of side gears 81, 82 comprising bevel gears, and pinions 83 which are geared with both the side gears 81, 82. The first side gear 81 on an axially inner side is defined to be the first rotational element. The second side gear 82 on an axially outer side is defined to be the second rotational element. The differential gear case 80 is defined to be the third rotational element. The first side gears 81, 81 of both the differential gears 8L, 8R are coupled to each other. The second side gears 82, 82 of both the differential gears 8L, 8R are respectively coupled to the coupling shafts 6L, 6R for the left and right rear wheels. Further, the differential gear case 80 of the right side differential gear 8R is arranged to be driven for rotation by the driving source 9. The differential gear case 80 of the left differential gear 8L is arranged to be switchable between a state in which the differential gear case 80 is coupled to the second side gear 82 and a state in which the differential gear case 80 is prevented from rotating. In other words, the movable dog 10b of the switching means 10 is slidably engaged with the differential gear case 80 so as to be nonrotatable relative to the differential gear case 80. The movable dog 10b is arranged to be selectively engaged with the dog 10c which is mounted on the second side gear 82 of the left side differential gear 8L and with the casing 7a. It may also be so arranged that the differential gear case 80 of the left side differential gear 8L is coupled to the first side gear 81 via the switching means 10.

In the seventh embodiment, if the differential gear case 80 of the left side differential gear 8L is coupled to the second side gear 82 of the left side differential gear 8L by the switching means 10, the second side gear 82 comes to be rotated together or integrally with the first side gear 81 of the right side differential gear 8R. By rotating the differential gear case 80 of the right side differential gear 8R in the normal direction or in the reverse direction by means of the driving source 9, the left and right rear wheels 5L, 5R are rotated both in the normal direction or both in the reverse direction. Starting assistance for forward running or the reverse running can thus be performed.

If the differential gear case 80 is prevented from rotating by the switching means 10, the first side gear 81 of the left side differential gear 8L rotates in the opposite direction at the same rotational frequency (rotational speed) as the second side gear 82, i.e., as the left rear wheel 5L. As long as the left and right rear wheels 5L, 5R are rotated at the same rotational frequency, the differential gear case 80 of the right side differential gear 8R does not rotate. Then, if the differential gear case 80 of the right side differential gear 8R is rotated in the normal direction by the driving source 9, the second side gear 82 of the right side differential gear 8R is rotated with increasing speed as compared with the first side gear 81. The right rear wheel 5R is thus rotated with increasing speed as compared with the left rear wheel 5L. Further, if the differential gear case 80 of the right side differential gear 8R is rotated in the opposite direction, the first side gear 81 of the right side differential gear 8R is rotated with increasing speed as compared with the second side gear 82. As a result, the left rear wheel 5L is rotated with increasing speed as compared with the right rear wheel 8R, whereby cornering assistance is performed.

Figure 9:
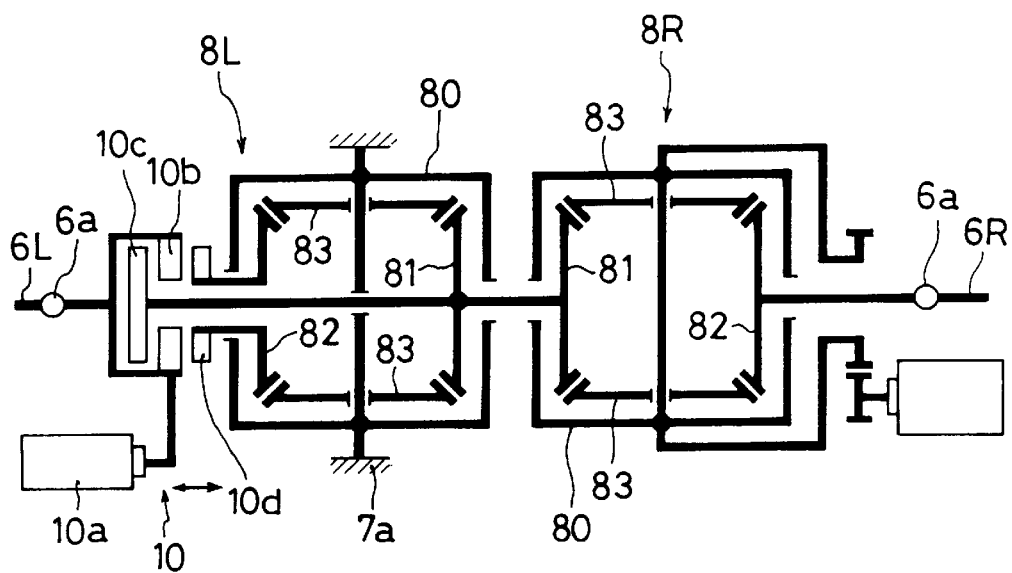
FIG. 9 is a skeleton diagram showing an eighth embodiment of the coupling device of the present invention.

FIG. 9 shows an eighth embodiment of the coupling device 7. The differences of this embodiment from the seventh embodiment are as follows. Namely, the differential gear case 80 of the left side differential gear 8L is coupled to the casing 7a to thereby prevent the differential gear case 80 from rotating. The first side gear 81 and the second side gear 82 of the left side differential gear 8L are selectively coupled to the coupling shaft 6L for the left rear wheel via the switching means 10. In other words, the movable dog 10b of the switching means 10 is slidably engaged with the coupling shaft 6L so as to be nonrotatable relative to the coupling shaft 6L. The movable dog 10b is selectively engaged with the dogs 10c, 10d which are respectively mounted on the first side gear 81 and the second side gear 82 of the left side differential gear 8L.

In the eighth embodiment, starting assistance is performed by coupling the first side gear 81 of the left side differential gear 8L to the coupling shaft 6L by the switching means 10. Cornering assistance is performed by coupling the second side gear 82 of the left side differential gear 8L to the coupling shaft 6L.

Figure 10:
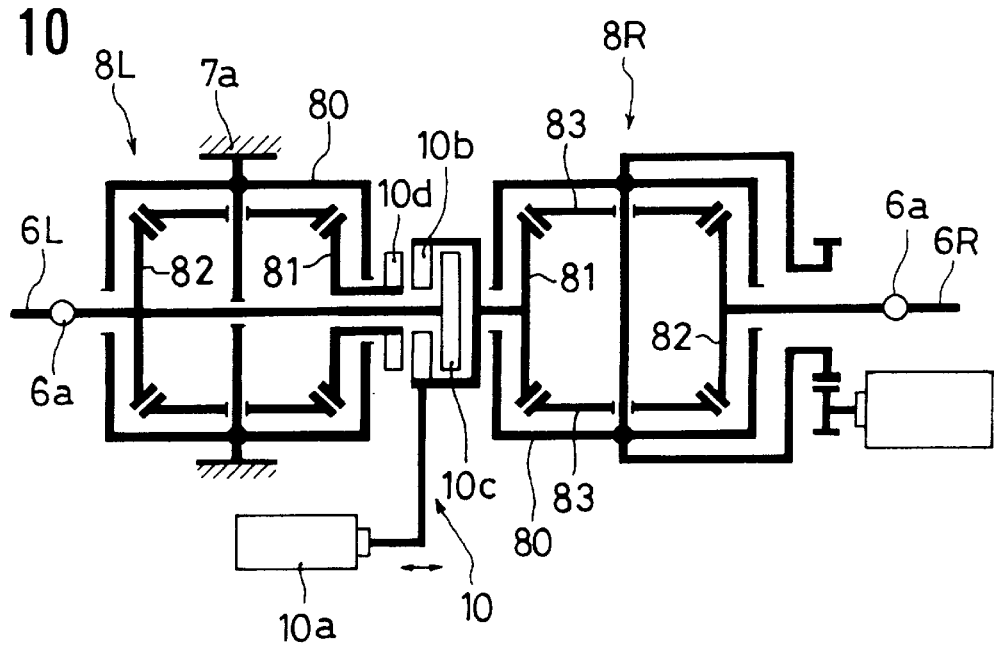
FIG. 10 is a skeleton diagram showing a ninth embodiment of the coupling device of the present invention.

FIG. 10 shows a ninth embodiment of the coupling device 7. The differences of this embodiment from the seventh embodiment are as follows. Namely, the differential gear case 80 of the left side differential gear 8L is coupled to the casing 7a so as to be nonrotatable relative to the differential gear case 80. The first side gear 81 of the right side differential gear 8R is selectively coupled to the second side gear 82 and the first side gear 81 of the left side differential gear 8L via the switching means 10. In other words, the movable dog 10b of the switching means 10 is slidably engaged with the first side gear 81 of the right side differential gear 8R so as to be nonrotatable relative to the first side gear 81. The movable dog 10b is selectively engaged with dogs 10c, 10d which are respectively mounted on the second side gear 82 and the first side gear 81 of the left side differential gear 8L.

In the ninth embodiment, starting assistance is performed by coupling the first side gear 81 of the right side differential gear 8R to the second side gear 82 of the left side differential gear 8L by the switching means 10, and cornering assistance is performed by coupling the first side gear 81 of the right side differential gear 8R to the first side gear 81 of the left side differential gear 8L.

Explanations have so far been made about embodiments to which the present invention is applied to the coupling device which is disposed between the rear wheels of a front-wheel-drive vehicle. The present invention can also be applied to the coupling device which is disposed between the front wheels of a rear-wheel-drive vehicle.

It is readily apparent that the above-described coupling device to be disposed between left and right wheels of a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A coupling device which is disposed between left and right wheels of a vehicle, comprising:

a pair of differential gears, each comprising first, second, and third rotational elements which are rotatable relative to one another, wherein said first rotational elements of both said differential gears are coupled to each other, and wherein said second rotational elements of both said differential gears are coupled to the left and right wheels respectively;

a driving source which drives to rotate said third rotational element of one of said differential gears; and switching means which is switchable between a state in which said third rotational element of the other of said differential gears is prevented from rotating, and a state in which said third rotational element of the other of said differential gears is coupled to one of said first rotational element and said second rotational element of said the other of said differential gears such that said first through said third rotational elements of said the other of said differential gears are rotatable together.

2. A coupling device which is disposed between left and right wheels of a vehicle, comprising:

a pair of differential gears, each comprising first, second, and third rotational elements in which difference rotation can be generated, wherein said first rotational elements of both said differential gears are coupled to each other, and wherein said second rotational element of one of said differential gears is coupled to one of the left and right wheels;

a driving source which drives to rotate said third rotational element of said one of the differential gears;

wherein said third rotational element of the other of said differential gears is prevented from rotating;

switching means which selectively couples said first rotational element and said second rotational element of said the other of the differential gears to the other of the left and right wheels.

3. A coupling device which is disposed between left and right wheels of a vehicle, comprising:

a pair of differential gears, each comprising first, second, and third rotational elements in which difference rotation can be generated;

switching means which selectively couples said first rotational element of one of said differential gears to said first rotational element and said second rotational element of the other of said differential gears;

wherein said second rotational elements of both said differential gears are coupled to the left and right wheels respectively;

a driving source which drives to rotate said third rotational element of said one of said differential gears;

wherein said third rotational element of said the other of said differential gears is prevented from rotating.

* * * * *